United States Patent Office 3,708,306
Patented Jan. 2, 1973

3,708,306
COMPOSITION USING PSYLLIUM BY-PRODUCTS FOR PET FOODS
Milo Don Appleman, 4315 San Rafael Ave., Los Angeles, Calif. 90042
No Drawing. Continuation of appplication Ser. No. 665,252, Sept. 5, 1967. This application Aug. 12, 1970, Ser. No. 63,317
Int. Cl. A23k 1/14
U.S. Cl. 99—2 R  3 Claims

ABSTRACT OF THE DISCLOSURE

The applicant has found a way to convert "psyllium flours" or other psyllium or plantago residues, a proteinaceous material known in the trade as "lard gelatin" or "Dri Pro" and other feed materials and beneficial chemicals into soft moist, canned or dry pet foods. The two ingredients named are important ingredients and, although preferably used together, said foodstuffs may be made by including only one and substituting other materials for the other. Examples of these processes are included in this application. All of these foodstuffs have been tested in animal feeding and found to be extremely palatable and nourishing to the animals concerned. A method of inactivating certain enzymes in the psyllium that otherwise cause darkening or blackening of colors in pet foods, such as semi-moist burgers and biscuits, has also been found and claim is made for the exclusive use of this process.

---

This application is a continuation of Ser. No. 665,252 filed on Sept. 5, 1972, and now abandoned.

At the present time in the United States it is essential to find more effective ways to use by-products of industry and of agricultural industries into foodstuffs for the human or feeds for animals. One example of these products are "psyllium flour" and by-products of psyllium seed also known as plantago kernel. At the present when the usable mucilage has been removed from this material the remaining meal or residue is sold as cattle food at approximately $20.00 per ton. Another by-product, this one of the meat packing industry is a product known as "lard gelatin" or "Dri Pro." This product is produced and sold by Hormel Co. It is a high protein product containing most if not all of the essential amino acids and at the present time has a sale price of approximately 0.09 a pound.

The applicant realized that these two products might have many applications even though the "psyllium flour" tended to ball up and stick and to have certain difficulties in workability. The "lard gelatin" has an odor that is obnoxious to most or all humans and many animals but was easily masked by the applicant in the making of pet foods.

The first pet foods made using these two ingredients were soft moist pet foods which were rolled out after coloring to imitate steak or roast. A small amount of the uncolored food or food to which titanium oxide had been added gave the marbling effect of fat.

(I) Soft moist pet food processing: Although several permitted and some non-permitted red colors were used in the experimental work it was noted that, although a beautiful red meat like color was obtained, this would darken or blacken within hours. This reaction was probably an oxidation and the factor concerned was located in the psyllium or pantago flour or meal. A great amount of experimentation was done on the prevention of darkening and it was discovered that this system could be inactivated with sulfites. At the present time the applicant is using between 0.4 to 2.0 lbs. of sodium metabisulfite per ton of finished soft moist pet food. The metabisulfite is usually added to the psyllium flour with all or most of the water to be used and heated to 60–100° C. The heating is not essential but it inactivates the system causing darkening in a moment or two with heating. The sulfite in total or in a large part is also destroyed in the process. The applicant has used sulfurous acid, sodium and potassium sulfites and metabisulfites and wishes to claim all of these and similar sulfites and thiosulfite compounds for this purpose.

It is possible to package all of the ingredients as a single dry mix for the production of soft moist dog food so that only water, propylene glycol and tallow need be added at reconstitution. However, as indicated above the applicant finds it preferable to package the "psyllium flour" and sodium metabisulfite as one component and the remainder of the ingredients as the second component of a dry mix. The formula of one such product now in use and the economics is as follows:

|  | Percent | Lbs./ton | Cost lb. | Cost ton |
|---|---|---|---|---|
| A.— |  |  |  |  |
| Psyllium flour (future) | 12.1 | 242 | 0.05 | $12.10 |
| Metabisulfite | 0.08 | 1.6 | 0.05 | 1.00 |
| Water | 36.4 | 728 |  |  |
| B.— |  |  |  |  |
| Masa flour (corn) | 28.25 | 565 | 0.055 | 29.60 |
| Lard gelatin | 12.9 | 258 | 0.09 | 23.22 |
| Di cal PO₄ | 0.807 | 16.1 | 0.20 | 3.20 |
| Salt | 0.807 | 16.1 | 0.02 | 0.32 |
| Garlic (or other spices) | 0.08 | 1.6 | 0.35 | 0.56 |
| Meat meal | 0.807 | 16.1 | 0.05 | 0.81 |
| Fish meal | 0.807 | 16.1 | 0.05 | 0.81 |
| Sorbistat | 0.1 | 2.0 | 1.50 | 3.00 |
| Color (red) | 0.024 | 0.5 |  | 1.50 |
| Propylene glycol | 6.94 | 140.0 | 0.30 | 42.00 |
| Ingredient cost per ton basics |  |  |  | $117.13 |

Added costs (undetermined):

Vitamin mixture—optional to process—necessary for food stuff:                           Per lb./product
    Vitamin A palmitate _____ 2500 USP units.
    Vitamin $D_2$ supplement _____ 750 USP units.
    Thiamin hydrochloride _____ 2 milligrams.
    Riboflavin _____ 1.5 milligrams.
    Vitamin E supplement _____ 715 I.U.
Minor elements:
    Copper _____ 0.0008%.
    Zinc _____ 0.0008%.
    Cobalt _____ 0.0008%.
    Manganese _____ 0.0008%.
    Iron _____ 0.018%.

The above formulation produces a pet food of 18.5% protein which can be increased to above 20% by adding 20 more pounds of lard gelatin and eliminating 20 pounds Masa flour.

Other but smaller batches of exactly the same formulation will be made up either uncolored or preferably containing 1.0 to 1.5 grams of titanium dioxide ($TiO_2$) per pound of product. This is used at approximately 10% of the total to produce a fat-like appearance.

Tallow stabilized with an antioxidant can be added to the pet food during blending to increase the fat content. This is usually added at the rate of 4.0% to 5.0% of the finished weight.

Sugar may also be added to increase the palatability and has been added on occasion. However, this is not essential.

In the act of making the soft moist pet food the psyllium flour containing the metabisulfite is placed in a Cauldron, hot water is added and additional heating may be done by steam or other low heat with stirring. If the water is boiling, additional heating is not necessary and this reaction may occur in a silent cutter or homogenizer that will be used to mix the entire ingredients. A silent cutter such as that used in the meat industry has been used by the applicant for most of his mixing as this is one of the few pieces of equipment that will permit mixture.

After inactivating the system that would otherwise cause browning the other ingredients are added either separately or as a premix. The glycol and tallow serve to permit the blending of the ingredients. The water content is not essential in this process but the applicant prefers water levels of 30 to 45% in the finished product.

When the mixing is complete the red or meat colored fraction is rolled in a thin layer across the surface. The two may be blended in a slow moving blendor or extruded simultaneously the white through an extruder of approximately 1 inch diameter (.75 sq. in.) the red through a pipe of 4 inch diameter (2.4 sq. in.) the material passing at once between rollers to press these into layers. The layered material can then be wire or knife cut and packaged for the trade.

The applicant has substituted meat trim and viscera (e.g., fluke livers, washed paunches, heart trim, etc.) for the "lard gelatin." In this case this is not handled as a dry mix product but equivalent weights of trim and viscera that will result in the same final protein are cut in the silent cutter first. Since this material contains many viable organisms including potential pathogens such as flukes or Salmonella, it must be heated to destroy these. The applicant prefers not to depend upon the friction heat of the chopper alone but has used two systems alone or in combination. In the silent cutter he is using, there is a bank of infra red lamps one foot above full chopper level. There is also a 1 inch dry steam line projecting 2 inches below full chopper height. Normally friction heat and dry steam heat the material in the chopper to 165° F. within 4 minutes. If frozen material is handled the infra red lamps are used. In large scale processing the applicant will precook all raw meat compounds separately measuring these into the chopper to reach correct protein content.

When fresh trim and viscera is used in processing there is little additional water added to the product.

This pet food may be produced by eliminating the "psyllium flour" and substituting materials that will produce a gummy, pasty or soft type of texture. Caseinate and lipoprotein are two proteinaceous materials that will work and dextrin and pregelatinized starch are carbohydrate materials that can be used. The applicant has found that 3% of the proteinaceous materials and from 3 to 6% pregelatinized starch will replace the psyllium flour in which case metabisulfite is not used. For cat foods basically the basic formula is built up with fish and chicken.

(II) Canned pet foods: The applicant has used a formulation rather similar to that of the soft moist pet food as a canned pet food or canned pet food base. The water content of the canned pet food must be approximately 75-80% and the protein content approximately 7%.

For canned pet foods or pet food base it is not necessary to block the enzymatic reactions with sulfite or metabisulfite as there will be no added color and also the product will be heat sterilized which in itself will inactivate all enzymes.

The basis for the use of the psyllium flour in this foodstuff is that it has large amounts of gum remaining that furnish body thus helping "set-up" the canned food. The "lard gelatin" furnishes protein and simultaneously gives additional body of a different kind in that as a protein it gives a "fullness" or "mouthiness" to the product. The other ingredients in the formula such as masa flour and soya flour furnish different protein furnishing the full spectrum of amino acids and also the carbohydrates burned for energy and converted into glycogen, fats and other compounds by the animals. The pregelatinized starch or non-gelatinized starch helps set the product into a firm substance. The meat meal, fish meal and garlic furnish agreeable flavors covering the odor of the lard gelatin. The percentages shown in the following formula are only representative as wide variations are possible. The lard gelatin may be increased if a canned pet food of 8–10% protein is desired. Bulking agents such as bran may be added. The following formula is one that has bulk but very little crude fiber.

CANNED PET FOOD OR PET FOOD BASE

| | Percent | Lbs./ton | Cost |
| --- | --- | --- | --- |
| Psyllium flour or residue | 6.6 | 133.20 | $6.66 |
| Soya flour | 1.11 | 22.20 | 1.70 |
| Masa flour | 10.0 | 200.00 | 11.00 |
| Starch (pregelatinized) | 1.27 | 25.40 | 2.28 |
| Gelatin (lard) | 6.66 | 133.20 | 11.98 |
| Meat meal | 0.89 | 17.76 | .89 |
| Salt | 1.00 | 20.00 | .40 |
| Fish meal | 0.22 | 4.40 | .22 |
| Garlic (or other spices) | 0.06 | 1.20 | .42 |
| Dicalcium phosphate | 1.00 | 20.00 | 4.00 |
| Total | | 577.20 | $39.55 |
| Water | | 1,422.80 | |
| Grand total | | 2,000.00 | |

NOTE.—Product: 28.8% solid, 71.2% moisture, 8-9% protein.

None of the above ingredients are actually critical as the psyllium flour can be substituted with a mixture of soya flour and starch and the "lard gelatin" with meat trim and viscera. Animal or vegetable fat can be added as desired. Frequently 2% tallow is added.

The applicant has canned the above product in a wide range of formulations which have been appealing to both the animal and the human food merchandiser. The above formulation serves as an excellent base for the addition of 5 to 30 percent ground poultry or poultry residues, fish or fish residues or meat trim and offal. If sufficient bone is present as in chicken backs, necks and viscera cut in large choppers the dicalcium phosphate may be omitted.

This material is heated to produce a uniform product filled hot into cans, sealed and processed at 10 lbs. or 15 lbs. steam pressure for the appropriate time depending upon the size of the container.

(III) Dry type pet foods.—Kibble, biscuits, etc.: The applicant has made "dry type" pet foods using the "psyllium flour" and "lard gelatin" as basic ingredients. To produce a dry type product the dry ingredients are mixed with water usually on a weight for weight basis. Again many variations have been made. For example dry whey, dry skim milk and other substances have been added to the basic formulation and although each of these has some special function, e.g., sweeter taste, browner products, etc., the main purpose here is to claim the use of "psyllium flour or residue" and "lard gelatin" alone or together in this product as in the others.

One formulation used for pet feeding has been as follows:

| | |
|---|---|
| Psyllium flour or residue | 3–12 |
| Soya flour | 0–10 |
| Masa flour | 20–35 |
| Lard gelatin | 5–15.0 |
| Meat meal | 1.0 |
| Salt | 1.0 |
| Fish meal | 1.0 |
| Garlic (or other spices) | 0.06 |
| Dicalcium phosphate | 0.5–2.0 |
| Tallow (optional) | 0.5–4.0 |
| Water | 50 |
| Sorbistat (optional) | 0.1 |

The above are optimum ranges although biscuits or kibble can be made above or below the range of any one ingredient. Also chopped fish, poultry by-products or meat by-products may be added the water needed being reduced as calculated.

The ingredients are stirred or kneaded into a batter and baked as in any other product. The batter can be molded, stamped, extruded in shapes prior to baking.

I claim:
1. A composition adapted for preparing dry pet food comprising about 3 to 12 parts, by weight, of psyllium seed flour, about 5 to 15 parts, by weight, of lard gelatin, about 20 to 35 parts, by weight, of masa flour, and about 50 parts, by weight, of water.
2. A process for preparing dry pet food which comprises:
 (a) stirring into a batter a composition containing about 3 to 12 parts, by weight, of psyllium seed flour, about 5 to 15 parts, by weight, of lard gelatin, about 20 to 35 parts, by weight, of masa flour, and about 50 parts, by weight, of water;
 (b) forming said batter into shaped pieces; and
 (c) baking said shaped pieces.
3. A moist pet food containing about 71.2 percent, by weight, of moisture and about 28.8 percent, by weight, of solids, said solids consisting essentially of:

| | Percent, by weight |
|---|---|
| Psyllium seed flour | 6.60 |
| Lard gelatin | 6.66 |
| Masa flour | 10.00 |
| Soya flour | 1.11 |
| Starch | 1.27 |
| Meat meal | 0.89 |
| Salt | 1.00 |
| Fish meal | 0.22 |
| Spice | 0.06 |
| Dicalcium phosphate | 1.00 |

References Cited

UNITED STATES PATENTS

| | | | |
|---|---|---|---|
| 3,115,409 | 12/1963 | Hallinan et al. | 99—7 |
| 1,891,697 | 12/1932 | Tuvin | 424—195 |
| 2,060,336 | 11/1936 | Near et al. | 99—131 |
| 2,095,259 | 10/1937 | Kober et al. | 424—195 |
| 2,355,028 | 8/1944 | Musher | 99—-93 |
| 3,202,578 | 8/1965 | Parker | 424—195 |

FOREIGN PATENTS

| | | |
|---|---|---|
| 1,461,347 | 11/1966 | France. |

OTHER REFERENCES

Vohra et al.: 1964, Poultry Science, vol. 43, "Growth Inhibitory Effect of Certain Polysaccharides," pp. 1164–1170.

Chemicals Used in Food Processing, National Academy of Sciences-National Research Council, 1965, p. 11.

Bottini: Chemical Abstracts, 1940, vol. 34, 26259.

WILBUR L. BASCOMB, JR., Primary Examiner

C. P. RIBANDO, Assistant Examiner

U.S. Cl. X.R.

99—94